US009567499B2

(12) United States Patent
Thiele et al.

(10) Patent No.: US 9,567,499 B2
(45) Date of Patent: *Feb. 14, 2017

(54) TWO-COMPONENT POLYURETHANE COMPOSITION WITH DELAYED CROSSLINKING

(71) Applicant: Henkel AG & Co. KGaA, Duesseldorf (DE)

(72) Inventors: Lothar Thiele, Langenfeld (DE); Oliver-Kei Okamoto, Duesseldorf (DE); Werner Juettner, Duesseldorf (DE)

(73) Assignee: Henkel AG & Co. KGaA, Duesseldorf (DE)

( * ) Notice: Subject to any disclaimer, the term of this patent is extended or adjusted under 35 U.S.C. 154(b) by 267 days.

This patent is subject to a terminal disclaimer.

(21) Appl. No.: 13/804,769

(22) Filed: Mar. 14, 2013

(65) Prior Publication Data

US 2013/0203935 A1 Aug. 8, 2013

Related U.S. Application Data

(63) Continuation of application No. PCT/EP2011/072852, filed on Dec. 15, 2011.

(30) Foreign Application Priority Data

Jan. 18, 2011 (DE) ........................ 10 2011 002 809

(51) Int. Cl.
| | |
|---|---|
| B32B 27/40 | (2006.01) |
| B29C 43/00 | (2006.01) |
| B27N 3/10 | (2006.01) |
| C08G 18/08 | (2006.01) |
| C08G 18/65 | (2006.01) |
| C08G 18/72 | (2006.01) |
| C08K 3/16 | (2006.01) |
| C08K 3/24 | (2006.01) |
| C08K 5/09 | (2006.01) |
| C08L 75/04 | (2006.01) |
| C09J 175/04 | (2006.01) |

(52) U.S. Cl.
CPC .............. *C09J 175/04* (2013.01); *B27N 3/10* (2013.01); *B29C 43/00* (2013.01); *B32B 27/40* (2013.01); *C08G 18/089* (2013.01); *C08G 18/65* (2013.01); *C08G 18/724* (2013.01); *C08G 18/725* (2013.01); *C08K 3/16* (2013.01); *C08K 3/24* (2013.01); *C08K 5/09* (2013.01); *C08L 75/04* (2013.01)

(58) Field of Classification Search
CPC ..... C08G 18/089; C08G 18/65; C08G 18/724; C08G 18/725; C08K 3/16; C08K 3/24; C08K 5/09; C08L 75/04; C09J 175/04; B27N 3/10; B29C 43/00; B32B 27/40

See application file for complete search history.

(56) References Cited

U.S. PATENT DOCUMENTS

| | | |
|---|---|---|
| 2,866,774 A | 12/1958 | Price |
| 3,635,906 A | 1/1972 | Jayawant |
| 3,895,149 A | 7/1975 | Sheffler et al. |
| 4,150,212 A * | 4/1979 | Meyborg ........................ 528/52 |
| 4,322,327 A | 3/1982 | Yoshimura et al. |
| 4,395,528 A | 7/1983 | Leiner et al. |
| 4,474,836 A | 10/1984 | Lukoschek et al. |
| 4,611,044 A | 9/1986 | Meyer et al. |
| 4,871,854 A | 10/1989 | Oberth et al. |
| 5,349,040 A | 9/1994 | Trinks et al. |
| 5,474,827 A | 12/1995 | Crandall et al. |
| 6,084,026 A | 7/2000 | Jamasbi |
| 6,124,380 A | 9/2000 | Bossert et al. |
| 6,503,995 B2 | 1/2003 | Tsuji et al. |
| 6,619,582 B1 | 9/2003 | Joergensen |
| 6,914,110 B2 | 7/2005 | Tsuji et al. |
| 7,351,782 B2 | 4/2008 | Wakabayashi et al. |
| 7,550,547 B2 | 6/2009 | Wakabayashi et al. |
| 7,807,756 B2 | 10/2010 | Wakabayashi et al. |
| 7,834,123 B2 | 11/2010 | Suen |
| 7,910,682 B2 | 3/2011 | Okamoto et al. |
| 7,998,919 B2 | 8/2011 | Rong et al. |
| 8,507,059 B2 | 8/2013 | Kuriyama et al. |

(Continued)

FOREIGN PATENT DOCUMENTS

| | | |
|---|---|---|
| CA | 2021308 A1 | 2/1991 |
| CN | 1144564 A | 3/1997 |

(Continued)

OTHER PUBLICATIONS

International Search Report for PCT/EP2011/072852, dated Jul. 11, 2012, 5 pages.
EN ISO 11357; Plastics—Differential scanning calorimetry; 1997; European Committee for Standardization; 12 pages.
EN ISO 527-3; Plastics—Determination of tensile properties; 2001; European Committee for Standardization; 6 pages.
EN ISO 1172; Textile-glass reinforced plastics; Prepregs, moulding compounds and laminates; 1996; European Committee for Standardization; 8 pages.

(Continued)

*Primary Examiner* — Patrick Niland
(74) *Attorney, Agent, or Firm* — James E. Piotrowski

(57) ABSTRACT

The invention relates to a crosslinking two-component polyurethane composition consisting of (i) a constituent A containing polyols and additives, and (ii) a constituent B containing between 100 and 65 wt. % of aromatic polyisocyanates, between 0 and 35 wt. % of aliphatic polyisocyanates, and between 0.05 and 3.0 wt. % of a retarder, and optionally additives, the mixed composition having a viscosity (EN ISO 2555) of between 100 mPas and 3000 mPas at 25° C., and the crosslinked composition having a glass transition temperature (Tg) of higher than 50° C. and a pot life of longer than 60 minutes. The two-component polyurethane composition is suitable as an adhesive and as a matrix substance for composite materials.

18 Claims, No Drawings

(56) References Cited

U.S. PATENT DOCUMENTS

| | | |
|---|---|---|
| 2002/0115770 A1 | 8/2002 | Georgeau et al. |
| 2003/0130470 A1* | 7/2003 | Bleys ................ C08G 18/7664 528/44 |
| 2004/0210027 A1* | 10/2004 | Hayashi et al. ................ 528/76 |
| 2005/0171315 A1 | 8/2005 | Wakabayashi et al. |
| 2006/0047063 A1 | 3/2006 | Schaub et al. |
| 2006/0051572 A1 | 3/2006 | Suzuki et al. |
| 2006/0069225 A1 | 3/2006 | Wintermantel et al. |
| 2006/0180274 A1 | 8/2006 | Burckhardt et al. |
| 2006/0287408 A1 | 12/2006 | Baikerikar et al. |
| 2007/0270567 A1 | 11/2007 | Suen |
| 2009/0145067 A1 | 6/2009 | Tatley et al. |
| 2009/0247720 A1 | 10/2009 | Wang et al. |
| 2010/0041810 A1 | 2/2010 | Wakabayashi et al. |
| 2014/0371391 A1* | 12/2014 | Ferencz et al. ................ 524/871 |

FOREIGN PATENT DOCUMENTS

| | | |
|---|---|---|
| CN | 1703437 A | 11/2005 |
| CN | 1726155 A | 1/2006 |
| DE | 1956672 A1 | 6/1970 |
| DE | 108103 A1 | 9/1974 |
| DE | 4442353 A1 | 5/1996 |
| DE | 4419449 A1 | 7/1997 |
| DE | 10244142 A1 | 1/2004 |
| EP | 0549210 A2 | 6/1993 |
| EP | 0520426 B1 | 4/1996 |
| EP | 1288247 A1 | 3/2003 |
| EP | 1464661 A1 | 10/2004 |
| EP | 1591373 A1 | 11/2005 |
| EP | 1591488 A2 | 11/2005 |
| EP | 1187020 A1 | 2/2008 |
| JP | 03076777 A | 4/1991 |
| JP | 04272985 A | 9/1992 |
| JP | 9510557 A | 10/1997 |
| JP | 2005241662 A | 9/2005 |
| JP | 2006070118 A | 3/2006 |
| JP | 2006097018 A | 4/2006 |
| JP | 2007308705 A | 11/2007 |
| JP | 2009051965 A | 3/2009 |
| JP | 2010023379 A | 2/2010 |
| WO | 9525970 A2 | 9/1995 |
| WO | 96/17014 A1 | 6/1996 |
| WO | 02/066572 A1 | 8/2002 |
| WO | 2004/029121 A1 | 4/2004 |

OTHER PUBLICATIONS

EN ISO 2555; Resins in the liquid state or as emulsions or dispersions; 1989; European Committee for Standardization; 9 pages.

Li et al., Synthesis and characterization of 5-substituted 8-hydroxyquinoline derivatives and their metal complexes, Tetrahedron 64 (2008) 10986-10995.

International Search Report for International Application No. PCT/EP2010/066349 dated Jun. 8, 2011.

International Search Report for International Application No. PCT/US2011/035454 dated Feb. 8, 2012.

Database Registry [Online] Chemical Abstracts Service, Columbus, Ohio, US, Nov. 16, 1984 "Tinuvin 327", XP002629922.

Database Registry [Online] Chemical Abstracts Service, Columbus, Ohio, US, Nov. 16, 1984 "Tinuvin 328", XP002629923.

Database Registry [Online] Chemical Abstracts Service, Columbus, Ohio, US, Nov. 16, 1984 "U-220", XP002629924.

\* cited by examiner

TWO-COMPONENT POLYURETHANE COMPOSITION WITH DELAYED CROSSLINKING

The invention relates to a crosslinkable two-component composition based on polyurethanes, which is suitable as an adhesive and as a matrix binder for bonding for bonding fiber materials and composite components made of fiber materials. The invention also relates to a method for producing fiber composite parts of such two-component compositions and fibers.

WO 2004/029121 describes two-component polyurethane adhesives comprised of polyols based on diols and triols which crosslink via polyisocyanates. In addition, these adhesives contain substantial quantities of pigments such as highly disperse silicic acid, fillers and molecular sieve. Highly functional polyols for increasing the network density are not described there. Aromatic isocyanates are used as the crosslinking agent. This source also does not describe the addition of substances that retard the reaction.

WO 2002/066572 describes two-component polyurethane adhesives for wood-based materials containing up to 98% oleochemical polyols, 1 to 7.5% of a low-molecular diol with an OH number between 400 and 2000 as well as 1 to 7.5% of a trifunctional to pentafunctional polyol, additional additives and a resin, wherein the adhesive is crosslinkable via polyisocyanates. Pigments are also used. These adhesives do not have a low viscosity.

EP 0794977 describes two-component polyurethane adhesives comprised of polyols, highly dispersed silicic acid, fillers and molecular sieve which crosslink via aromatic polyisocyanates. Diols and triols are used as the polyols. The usual catalysts are described. This does not describe a crosslinking that is intentionally slow.

It is known that glass-fiber-reinforced plastic substrates may be bonded. Since such substrates have a high mechanical stability, it is necessary for the corresponding adhesives to also be able to absorb the corresponding forces. Examples of such bonds include the bonding of fiber-reinforced components for wings or other add-on parts of aircraft, bonding of fiber-reinforced components in the boat industry or bonding of fiber-reinforced components for producing blades for wind power plants.

These fiber-reinforced components contain fibers and a matrix binder. The mechanical requirements of these components are high. High tensile forces must be absorbed, the load due to permanent vibrations is high and leads to material fatigue. Furthermore, the environmental influences are great and it is necessary to ensure stability under great temperature differences as well as constant properties under different humidity conditions. It is known that such components can be produced using two-component epoxy binders. These have sufficient strength but have various disadvantages in processing. The components react in an exothermic reaction, so the temperature of the reaction mixture must be monitored. In addition, high post-crosslinking temperatures are often necessary to obtain an adequate final strength.

The known polyurethane adhesives are described for wood and metal bondings, but bonding or embedding of fiber materials is not described. Furthermore, there are no requirements of a high mechanical stability which also occurs under natural environmental stresses. The state-of-the-art adhesives are directed at a bonding that is flexible and stable at room temperature. Therefore, the glass transition temperature is usually low in order to achieve a suitable bonding. It should also have a high reactivity for rapid bonding. However, this results in the pot life being too short for bonding large areas and workpieces. These adhesives are also unsuitable for filling large molds uniformly with the adhesives because defect-free matrix materials are not obtained due to the rapid reaction.

The object of the present invention is therefore to provide a two-component composition based on polyurethane that will have a high mechanical stability as a crosslinked composition and will have good adhesion to composite components or to fiber materials that are to be embedded. In addition, the composition must have a low viscosity under processing conditions and must have a long pot life, so that filling into a fiber-filled mold is possible and no prematurely crosslinked, inhomogeneous regions are formed.

This invention is achieved by a crosslinking two-component polyurethane composition consisting of a component A, containing polyols and additives, a component B of 100 to 65 wt % aromatic polyisocyanates and 0 to 35 wt % aliphatic polyisocyanates plus optionally additives, such that the mixed composition has a viscosity of 200 mPas to 5000 mPas (EN ISO 2555) at 25° C. and has a pot life of 60 min, while the crosslinked composition has a glass transition temperature (Tg) of more than 50° C., wherein component B contains 0.05 to 3.0 wt % of at least one retarder.

Another subject matter of the invention relates to the use of such two-component polyurethane compositions for bonding fiber-reinforced moldings. Another subject matter relates to mixtures of fiber materials and these two-component polyurethane compositions.

Known high-strength fiber materials are suitable as components of composite materials. These may consist of, for example, glass fibers; synthetic fibers such as polyester fibers, polyethylene fibers, polypropylene fibers, polyamide fibers, polyimide fibers or aramid fibers; carbon fibers; boron fibers; oxidic or nonoxidic ceramic fibers such as aluminum oxide/silicon dioxide fibers, silicon carbide fibers; metal fibers of steel or aluminum, for example; or of natural fibers such as flax, hemp or jute. These fibers may be converted to the form of mattes, woven or knit fabrics, scrims, nonwovens or rovings. Two or more of these fiber materials may also be used as a blend. Short chopped fibers, preferably long fibers, in particular woven fabrics and scrims may be selected. Such high-strength fibers, scrims and woven fabrics are familiar to those skilled in the art. They are used, for example, in aviation engineering, marine engineering, automotive engineering or in other components that are subjected to high mechanical stresses.

Polyfunctional isocyanates are suitable as the polyisocyanates in the isocyanate component. The isocyanates preferably contain two to five, preferably to four, NCO groups on the average. Examples of suitable isocyanates include aromatic isocyanates such as 1,5-naphthylene diisocyanate, 2,4- or 4,4'-diphenylmethane diisocyanate (MDI), carbodiimide-modified MDI, xylylene diisocyanate (XDI), m- and p-tetramethylxylylene diisocyanate (TMXDI), the isomers of toluylene diisocyanate (TDI), 4,4'-diphenyl-dimethylmethane diisocyanate, di- and tetraalkyldiphenylmethane diisocyanate, 1,3-phenylene diisocyanate, 1,4-phenylene diisocyanate, 4,4'-dibenzyl diisocyanate; aliphatic isocyanates, such as hydrogenated MDI (H12MDI), 1-methyl-2,4-diisocyanatocyclohexane, 1,12-diisocyanatododecane, 1,6-diisocyanato-2,2,4-trimethyl-hexane, 1,6-diisocyanato-2,4,4-trimethylhexane, 1-isocyanatomethyl-3-isocyanato-1,5,5-trimethylcyclohexane (IPDI), tetramethoxybutane-1,4-diisocyanate, butane-1,4-diisocyanate, hexane-1,6-diisocyanate (HDI), dimeric fatty acid diisocyanate, dicyclohexylmethane diisocyanate, cyclohexane-1,4-diisocyanate, ethylene diisocyanate or phthalic acid bisisocyanato ethyl ester.

Low-molecular prepolymers may also be used, i.e., oligomers having a plurality of isocyanate groups, for example, the reaction products of MDI and/or TDI with low-molecular diols, e.g., ethylene glycol, diethylene glycol, propylene glycol, dipropylene glycol or triethylene glycol. These oligomers are obtained with an excess of monomeric polyisocyanate in the presence of diols. The molecular weight of the diols is generally less than 1000 g/mol. The reaction product may optionally be freed of monomers by distillation. Crude MDI or liquefied diphenylmethane diisocyanates containing carbodiimide are likewise suitable. Suitable aliphatic isocyanates include isocyanurates, carbodiimides and biurets of isocyanates, in particular of HDI or IPDI. The mixture of polyisocyanates should preferably be free-flowing at room temperature.

In one embodiment of the invention, it is necessary to use mixtures of aliphatic and aromatic polyisocyanates. If the quantities of aliphatic isocyanates present are too high, the mechanical stability of the crosslinked polymer will be too low. If the quantity of aromatic isocyanates is too high, such mixtures may crosslink too rapidly, making homogeneous filling of molds impossible. The quantity should be 99.5 to 65 wt % aromatic polyisocyanates and 0.1 to 35% aliphatic polyisocyanates, where the sum of the isocyanates should be 100%. Another embodiment uses exclusively aromatic isocyanates, but preferably at least 35 wt % isocyanates with different reactive groups are present. Examples include 2,4-MDI, 4,4'-MDI or corresponding mixtures.

The two-component polyurethane composition according to the invention has a low viscosity. The polyol component must also have a low viscosity. The polyol component should contain multifunctional polyols. It is advantageous if the polyol component also contains hydrophobic polyols. Suitable polyols include, for example, liquid polyhydroxy compounds with an average of 2 to 10 hydroxyl groups per molecule.

Examples of such hydrophobic polyols include OH-functional polybutadienes such as those available under the brand name "Poly-bd" which can be used as hydrophobic polyols for the compositions according to the invention.

However, hydrophobic polyols of an oleochemical origin may also be used. Oleochemical polyols are understood to be polyols based on natural oils and fats, e.g., the reaction products of epoxidized fatty substances with mono-, di- or polyfunctional alcohols or glycerol esters of long-chain fatty acids, substituted at least partially with hydroxyl groups. Such polyester polyols can be synthesized, for example, by complete ring opening of epoxidized triglycerides in which the ring opening has been performed while maintaining the ester bonds. Alcohols that may be used for ring opening of the epoxidized triglycerides include methanol, ethanol, propanol, isopropanol, butanol, hexanol, 2-ethylhexanol, fatty alcohols with 6 to 22 carbon atoms, cyclohexanol, benzyl alcohol, 1,2-ethanol, 1,2-propanediol, 1,3-propanediol, 1,4-butanediol, 1,6-hexanediol, neopentyl glycol, trimethylolpropane, glycerol, trimethylolethane, pentaerythritol, sorbitol as well as hydroxyl compounds containing ether groups, such as alkyl glycol or oligomeric glycols as well as oligomeric glycerols.

Another group of oleochemical polyols are the ring-opening products and ester exchange products of epoxidized fatty acid esters of low alcohols, i.e., of epoxidized fatty acid methyl, ethyl, propyl or butyl esters. Ring-opening products and ester exchange products with alcohols of the functionalities 2 to 4, in particular the reaction products with ethylene glycol, propylene glycol, oligomeric ethylene glycols, oligomeric propylene glycols, glycerol, trimethylolpropane or pentaerythritol are preferred here. The functionality can be increased by hydrogenation of the ester group.

Another group of polyols that are required according to the invention include higher functionalized polyols with 3 to 14 OH groups, in particular 4 to 9 OH groups. These polyols increase the crosslinking density of the polymers and yield improved strength. These may be mixtures of polyols. These polyols are different from the hydrophobic polyols mentioned above.

Examples of such polyols include sugar alcohols, which have a corresponding number of OH groups, in particular tetrites, pentites or hexites or those based on disaccharides. The aforementioned sugars may also be used, but hydrogenated sugar alcohols in particular. Examples include sorbitol, inositol, mannitol, threitol, erythritol, adonitol, arabitol, ribitol, xylitol, dulcitol, ribose, xylose, lyxose, glucose, galactose, mannose, allose, altrose, gulose, idose, talose, fructose, sorbose, psicose, tegatose, deoxyribose, glucosamine, galactosamine, rhamnose, digitoxose, saccharose, lactose, trehalose, maltose, cellobiose, melibiose, gestiobiose, rutinose. The corresponding ethoxylation and propoxylation products with up to fifteen alkylene oxide units may also be used.

Polyols with four, five or six OH groups having at least one tertiary amino group may optionally also be used. Examples include propoxylated or ethoxylated reaction products of $C_3$ to $C_6$ diamines or triamines. Ethoxylation and propoxylation products of ethylenediamine are suitable in particular.

The molecular weight of suitable higher functionalized polyols may amount to 120 to 3000 g/mol, in particular 250 to 2000 g/mol.

Polyether polyols may also be used. Examples include the reaction products of three to six functional alcohols, which can be synthesized by reacting ethylene oxide or propylene oxide, for example, polypropylene glycols. Another group of suitable polyether polyols are the polytetramethylene glycols, which can be synthesized, for example, by acidic polymerization of tetrahydrofuran. The molecular weight of these polyether polyols is generally between 200 and 6000 g/mol, preferably in the range of 300 to 3000 g/mol.

These higher-functionalized polyols may have equivalent weights of 30 to 400 g/eq, preferably 50 to 300 g/eq, while the molecular weight is approximately more than 500 and less than 1500 g/mol. The average functionality of the polyols in component A should be 2.2 to 5 on the average, in particular more than 2.5 to 4. Mixtures may also be used, so that individual components may contain a different number of OH groups. The various polyols are commercially available.

The higher-functional polyols usually have OH groups. In one embodiment, however, it is also possible for —SH or —NHR groups to also be present at least proportionately as reactive functional groups. In a preferred embodiment, however, compounds having primary, secondary or tertiary amino groups are not present in a composition that is suitable according to the present invention.

In addition, amounts of up to 10 wt % diols may also be present. These may be polyester diols. Polyester diols with a molecular weight of approx. 500 to approx. 1500 g/mol are suitable. Thus, for example, polyester polyols obtained by reacting low-molecular alcohols with lactones or by reacting dicarboxylic acids with diols may be used. Such polyester polyols are familiar to those skilled in the art. However, $C_2$ to $C_{10}$ diols or copolymers of ethylene oxide and/or propylene oxide with a molecular weight of less than 1000 g/mol may also be present.

The two-component polyurethane composition according to the inventions may also contain additives which are preferably mixed partially or entirely with the polyol component. These are understood to be substances which are usually added in small amounts to alter the properties of the adhesive, e.g., viscosity, wetting behavior, stability, reaction rate, bubble formation, storability or adhesion, in the desired direction and also to adapt the use properties to the intended purpose. Examples of additives include flow control agents, reaction retarders, thixotropy agents, catalysts, antiaging agents, coloring agents, desiccants, resins and/or wetting agents.

Catalysts may also be used. The usual organometal compounds that are known in polyurethane chemistry, e.g., iron compounds or tin compounds in particular are used as catalysts. Tertiary amines or amidines in particular may be used as catalysts, optionally in combination with the tin compounds listed above. A preferred embodiment of the two-component polyurethane composition according to the invention is free of such catalyzing substances.

In addition, the composition according to the invention may optionally contain additional stabilizers. Stabilizers in the sense of the present invention include antioxidants, UV stabilizers or hydrolysis stabilizers. Examples include the commercially available sterically hindered phenols and/or thioethers and/or substituted benzotriazoles and/or amines of the HALS type (hindered amine light stabilizer).

It is also possible that small amounts of plasticizer, ink pastes, molecular sieves, pigments or fillers are also present. The quantity of such ingredients should be less than 15 wt %, however. The quantity of fillers and pigments should preferably be less than 2 wt %. In particular no pigments, molecular sieves, fillers and/or plasticizers are included. The composition according to the invention should preferably not contain any organic solvents. Liquid compounds which capture moisture during storage may also be used as drying agents.

In addition, resins may optionally also be included. These may be natural resins or synthetic resins. A special embodiment uses resins that contain OH groups, in particular having multiple OH groups. These may then also be able to react with the isocyanates. In a preferred embodiment, the quantity may be between 5% and 30%.

The additives are selected so they do not enter into any reactions or side reactions with the isocyanates, at least not during the duration of the crosslinking reaction.

Retarders in the sense of this invention are understood to be substances which slow down the reaction between OH and NCO groups. Acid-reacting compounds are suitable for this purpose, for example, organic or inorganic carboxylic acids, acid chlorides, inorganic acid salts or other organic acid compounds. These should be present in amounts of 0.05 to 3.0 wt %.

According to the invention, organic acids to be used as retarders are those having a pKs range between 2.8 and 4.5, for example, such as phthalic acid, isophthalic acid, terephthalic acid, ascorbic acid, benzoic acid, o-hydroxybenzoic acid, p-hydroxybenzoic acid, 2,3-dihydroxybenzoic acid, 2,4-dihydroxybenzoic acid, 3,4-dihydroxybenzoic acid, salicylic acid, adipic acid, succinic acid, malic acid, acetylsalicylic acid, alanine, β-alanine, 4-aminobutyric acid, glycine, lactic acid, sarcosine, serine. However, formic acid, acetic acid, monochloroacetic or dichloroacetic acid, 2,4- or 2,6-dichlorophenylacetic acid; phosphoric acid, hydrogen phosphates; polymeric cation exchangers with carboxyl groups or with orthophosphate groups; lithium chloride, 4-toluylenesulfonyl isocyanate or acid chlorides of the carboxylic acids mentioned above may also be used. The compounds mentioned above may be used either individually or in mixtures.

A composition according to the invention may contain 5 to 40 wt % hydrophobic polyols as component A, in particular oleochemical polyols, 50 to 90 wt % tri- and higher functional polyols with an equivalent weight of 30 to 400 g/eq, 0 to 10 wt % diols with an equivalent weight of 30 to 500 g/eq and 0.05 to 10 wt % additives. A preferred embodiment should contain in particular up to 5% liquid desiccant. Another preferred embodiment should contain fractions of castor oil and/or polypropylene glycol. The sum of the percentages of the polyol component should always yield 100%.

In the isocyanate component B, 65 to 100 wt % aromatic polyisocyanates should be present as well as 0 to 35 wt % aliphatic isocyanate and 0 to 3 wt % of at least one retarder. In particular only aromatic isocyanates with different reactive NCO groups are present, for example. The ratio of isocyanate groups contained in the isocyanate component to the OH groups contained in the polyol components is usually in the range of equivalence, wherein a slight excess of isocyanate groups is expedient with regard to moisture present at the surface. The NCO/OH ratio should be between 0.90:1 and 1.5:1, in particular 1.0:1 to 1.2:1.

To produce the two-component polyurethane composition according to the invention, the polyol component is produced first. To do so, the liquid polyols may be mixed and then optionally solid components are to be dissolved in the mixture. This may also be supported by heating. Next the additives are added and dispersed. The moisture content should be kept low; for example, the amount of water can be reduced by using desiccants such as zeolites or by drying in vacuo. Some of the inert additives may also be added to the isocyanate component. The two components are stored separately until they are used. These two components are mixed together in an essentially known manner for use and the mixture is applied to the substrate to be bonded.

To permit an application according to the invention, a two-component polyurethane composition according to the invention has a viscosity in mixed form of 100 to 3000 mPas (measured with a Brookfield RTV, DIN ISO 2555), measured at a temperature between 20° C. and 60° C. In particular the viscosity should be from 100 to 1500 mPas, preferably less than 1000 mPas, measured at 20° C. to 40° C. The two-component polyurethane composition according to the invention can then be applied at these temperatures. The viscosity should be determined immediately after mixing, for example, up to two minutes after mixing, as it increases gradually due to the onset of the crosslinking reaction.

The two-component polyurethane composition according to the invention has a long pot life, which should be more than 60 minutes, in particular more than 90 minutes. The pot life shall be understood to be the time after which the viscosity of a mixture at 25° C. will have risen to more than 50,000 mPas. The pot life can be influenced through the choice of the polyols, the reactivity of the isocyanates and the amount and selection of the retarding substances.

The crosslinked composition according to the invention has a glass transition temperature (Tg) of 50° C. to 130° C. (measured with DSC, DIN 11357), in particular from 60° C.

to 110° C. A high mechanical stability of the composition is obtained due to the selection of the polyfunctional polyol according to the invention.

In addition, the subject matter of the invention is also a method for producing composite components. In this method, the compositions according to the invention are applied by introducing them into a mold. This mold should contain the fiber materials mentioned above, for example, in a directional form. According to the invention, the two components A and B are combined first, either in batches or continuously. Immediately thereafter, the liquid mixture is introduced into a closed mold. The fiber materials are already present in the mold and are arranged in the desired position. The compositions according to the invention may be introduced into the mold by vacuum or by pressure. It should be noted that the flow rate is selected so that air or gases between the fiber materials can escape. In another procedure, the mold containing the fiber material is covered with a film and is sealed to be vacuum-tight at the edge. The mold has openings through which a vacuum can be applied to the mold. The mixture according to the invention is drawn into the mold uniformly due to this vacuum. With this procedure, it is advantageous that possible inclusions of bubbles can be reduced due to the vacuum. Those skilled in the art are aware of such infusion methods in principle.

The molds can only be filled very slowly due to the size of the molds, which may even be more than 30 meters long. The compositions according to the invention have a pot life, which permits a slow oncoming flow against the fiber materials, a displacement of the air bubbles and a filling of the mold over a longer period of time. The fiber materials are then completely embedded in the matrix material.

After filling the mold, the composition begins to harden. This may be accomplished without any additional supply of heat. The heat of reaction released by the crosslinking reaction does not lead to local overheating of the substrates. To accelerate the crosslinking reaction, it is possible to heat the mold after it has been completely filled with the composition. The heating may be done at temperatures up to 90° C. Faster crosslinking of the matrix material is therefore achieved. Thus the mold may be removed from the molding sooner and is then available for additional working steps. The curing may also be performed in vacuo or under pressure.

The suitable compositions according to the invention yield a high mechanical stability after crosslinking as a composite part. The structural stability of the composite material can be measured by the E modulus, for example. The composition according to the invention ensures that the E modulus is greater than 1000 MPa at temperatures between −10° C. and +70° C. (like DIN EN ISO 527).

It may also be advantageous for an improvement in the properties of the crosslinked matrix to subject the moldings to a tempering process after curing. The molding should be brought uniformly to an elevated temperature between 40° C. and 90° C. for a period of time between 30 minutes and 24 hours. Regardless of the theory, it is assumed that an internal order of the crosslinking sites and partially crystalline regions is thereby obtained, leading to stable properties of the matrix. Thus the mechanical stability of the fully cured polymer material under thermal load should be improved after crosslinking.

The two-component polyurethane compositions according to the invention are suitable in particular for embedding fiber materials for the infusion method, for example. The known fiber materials are then arranged and embedded into a polymer matrix on the whole. This yields composite moldings having a high mechanical stability and good weather stability.

This composition has good adhesion to the fiber substrate. Due to the reduced viscosity, a defect-free matrix can be produced and in particular bubbles in the molding are prevented. Another advantage is that due to the delayed reactivity, the temperature of a composition according to the invention rises only slowly. Overheating of the composite parts is avoided so that damage to sensitive fiber materials is also prevented.

Another advantage of the composition is the increased weather stability of the fiber composite materials. There is no significant mechanical weakening of the parts even at an elevated temperature and elevated atmospheric humidity. Corresponding fiber moldings are thus suitable for use under highly variable weather conditions in particular.

The following examples illustrate the invention:

Measurements Methods:

Viscosity: Brookfield RVT (ISO EN 2555) at the stated temperature

Glass transition temperature (Tg): DSC

Pot life: The two components are brought to 25° C. and are mixed in the specified quantity ratio. The viscosity is determined at regular intervals. The time at which the viscosity has risen above 50,000 mPas is determined as the pot life.

Tensile strength, elongation at break, E modulus: DIN EN ISO 527 (test speed 1 mm/min)

Shear strength, shear deformation, shear modulus: DIN EN ISO 14129 (test speed 2 mm/min)

Fiber content: DIN EN ISO 1172

The ingredients of the polyol component are mixed and then dried in vacuo. The ingredients of the NCO component are mixed similarly. Components A and B that have been mixed at room temperature in a 1:1 ratio and then poured into vertical slab molds are used. The moldings harden for 1 hour at 30° C., then 4 hours at 80° C. Next the slabs are cut to form test bodies.

|  | 1 According to the invention | 2 According to the invention | 3 According to the invention | 4 Not according to the invention |
|---|---|---|---|---|
| Polyol component |  |  |  |  |
| Castor oil | 15.0 | 10.0 | 10.0 | 10.0 |
| 1,4-Butanediol | 2.5 | 2.5 | 2.5 | 0.0 |
| PPG 400 | 0 | 0 | 0 | 12.0 |
| PPG triol, mol. wt. 250 | 45.0 | 52.0 | 52.0 | 52.0 |
| PPG triol, mol. wt. 750 | 35.5 | 35.5 | 33.5 | 24.0 |
| Oxazolidine desiccant | 2.0 | 0 | 2.0 | 2.0 |
| Isocyanate component |  |  |  |  |
| MDI | 78.0 | 72.0 | 99.8 | 50.0 |
| HDI timer | 21.7 | 27.8 | 0 | 49.8 |
| Isophthalic acid dichloride | 0.3 | 0.2 | 0.2 | 0.2 |

|  | 1 | 2 | 3 | 4 |  |
|---|---|---|---|---|---|
| Viscosity (2 min) | 310 | 340 | 240 | 540 | mPas |
| Viscosity (1 h) | 48,500 | 48,000 | 49,000 | 42250 | mPas |
| E module | 2320 | 2350 | 3060 | 1465 | MPa |
| Tensile strength | 65.0 | 62.5 | 68.9 | 52.3 | MPa |
| Elongation at break | 5.0 | 5.2 | 6.1 | 4.1 | % |
| Tg | 66° C. | 64° C. | 71° C. | 46° C. |  |

Comparative Example 5 was performed like Example 2, with the provision that no isophthalic acid dichloride was added. The viscosity was the same as the initial viscosity; after 60 minutes the viscosity was 54,000 mPas.

Production of composite using the formulation according to Example 2: Pull-away woven fabric of polypropylene and a flow aid are placed on two layers of a biaxial glass fiber scrim on a polypropylene sheet. This structure is covered with a vacuum film that is affixed on the polypropylene sheet using sealing cord, so that a vacuum can be created between the sheet and the film (vacuum bag). The material feed is accomplished with PVC tubing from a storage container, which contains the mixed two-component polyurethane composition. In the vacuum bag, the resin is distributed through a slit tube. This works with a vacuum of 100 mbar, which is applied uniformly through a slit tube over the entire width of the scrim. After hardening for 12 hours at room temperature, the composite is tempered for 4 hours at 80° C.

Shear Tensile Properties

| Shear strength | Shear deformation | Modulus in shearing | Fiber mass content | Fiber volume content |
|---|---|---|---|---|
| 65 MPa | 0.07% | 3.9 GPa | 63% | 44% |

Value determination in ±45° direction

What is claimed is:

1. A crosslinking two-component polyurethane composition, consisting of
    a component A comprising polyols and additives, wherein component A contains no more than 10 wt % of diols having an equivalent weight of 30 to 500 g/eq,
    a component B containing 100 to 65 wt % aromatic polyisocyanates, 0 to 35 wt % aliphatic polyisocyanates, 0.1 to 3.0 wt % retarders and optionally additives,
    wherein the mixed composition has a viscosity (EN ISO 2555) of 100 mPas to 3000 mPas at 25° C.; the crosslinked composition has a glass transition temperature (Tg) of more than 50° C.; and has a pot life of more than 60 minutes.

2. The two-component polyurethane composition according to claim 1, wherein the polyol component A comprises 0 to 10 wt % diols with an equivalent weight of 30 to 500 g/eq, 50 to 90 wt % tri- and higher functional polyols with an equivalent weight of 30 to 400 g/eq, 5 to 40 wt % oleochemical polyols and 0 to 2 wt % catalysts.

3. The two-component polyurethane composition according to claim 1, wherein the retarder is selected from organic carboxylic acids, inorganic acids, acid chlorides, acid salts or acid isocyanates.

4. The two-component polyurethane composition according to claim 1, wherein less than 2 wt % pigments and fillers are contained therein.

5. The two-component polyurethane composition according to claim 1, wherein the aromatic polyisocyanates are selected from 2,4-MDI, 4,4-MDI and mixtures thereof, and the aliphatic isocyanates are selected from the oligomers of HDI.

6. The two-component polyurethane composition according to claim 1, wherein the composition is free of plasticizers, solvents and/or pigments.

7. The two-component polyurethane composition according to claim 1, wherein the two-component polyurethane composition, 60 minutes after being mixed, has a viscosity of less than 50,000 mPas.

8. The two-component polyurethane composition according to claim 1, wherein the crosslinked composition has a glass transition temperature of more than 50 to 130° C.

9. A method for producing composite parts of synthetic fibers and two-component polyurethane compositions, comprising providing the components of the composition according to claim 1; mixing the component of the composition of claim 1; and introducing the mixed composition under vacuum and/or pressure into a mold containing fibers.

10. The method according to claim 9, wherein the mixture of components is freed of enclosed gases before being introduced into the mold.

11. The method according to claim 9, wherein the composition is introduced into the mold at 15° C. to 35° C. and the crosslinking is accelerated by elevated temperature after the mold has been filled completely.

12. The method according to claim 9, wherein the fibers are selected from natural fibers, glass fibers, carbon fibers, synthetic fibers, ceramic fibers, boron fibers, metal fibers and combinations thereof.

13. The method according to claim 12, wherein the fibers are in the form of mats, woven fabrics, knit fabrics, rovings, and scrim.

14. A fiber composite material consisting of fibers and the two-component polyurethane composition according to claim 1.

15. The fiber composite material according to claim 14, wherein the fibers are contained directionally and are embedded in a matrix of the two-component polyurethane composition.

16. The two-component polyurethane composition according to claim 1 being free of catalysts.

17. The two-component polyurethane composition according to claim 1, wherein the average functionality of polyols in component A is 2.2 to 5.

18. The two-component polyurethane composition according to claim 1, wherein the average functionality of polyols in component A is 3 to 5.

* * * * *

UNITED STATES PATENT AND TRADEMARK OFFICE
CERTIFICATE OF CORRECTION

PATENT NO. : 9,567,499 B2
APPLICATION NO. : 13/804769
DATED : February 14, 2017
INVENTOR(S) : Lothar Thiele, Oliver-Kei Okamoto and Werner Juettner It is certified that error appears in the above-identified patent and that said Letters Patent is hereby corrected as shown below:

In the Specification

Column 2, Line 64: Change "1-isocyanatornethyl" to -- 1-isocyanatomethyl --.

Signed and Sealed this
Twenty-sixth Day of December, 2017

Joseph Matal
*Performing the Functions and Duties of the*
*Under Secretary of Commerce for Intellectual Property and*
*Director of the United States Patent and Trademark Office*